United States Patent Office 3,594,453
Patented July 20, 1971

3,594,453
METHOD OF PRODUCING ALPHA-METHYL-STYRENE RESIN
Carmen M. Cusano, Poughkeepsie, N.Y., assignor to Texaco Inc., New York, N.Y.
No Drawing. Filed July 25, 1968, Ser. No. 747,485
Int. Cl. C08f 15/04, 1/13
U.S. Cl. 260—880
5 Claims

ABSTRACT OF THE DISCLOSURE

A method of producing a synthetic graft polymer resin at an improved rate under aqueous emulsion polymerization conditions comprising polymerizing an aqueous dispersion of a member selected from the group consisting of butadiene and a mixture of butadiene and methacrylic acid to form a first polymer selected from the group consisting of polybutadiene and poly(butadiene-methacrylic acid) and polymerizing an aqueous latex of the first formed polymer together with alpha-methylstyrene, and acrylonitrile under aqueous emulsion polymerization conditions to form a synthetic resin composed of a polybutadiene or poly(butadiene-methacrylic acid) backbone having grafted thereon alpha-methylstyrene and acrylonitrile copolymers, said polymerizations being conducted in the presence of a quaternary ammonium chloride cationic emulsifier at a pH between about 6 and 8.

BACKGROUND OF INVENTION

This invention pertains to an area of synthetic resin art relating to graft copolymers resulting from the reaction of a vinylidene aromatic and acrylonitrile with a conjugated diolefin polymer or a conjugated diolefin-unsaturated carboxylic acid copolymer.

Graft polymers of acrylonitrile, butadiene and styrene are will known and widely used synthetic resins and are commonly referred to as ABS thermoplastic materials. They are composed of a polybutadiene rubbery backbone on which is grafted a styrene and acrylonitrile copolymer. Described in another manner ABS resins are looked upon as a dispersion of a rubbery phase polybutadiene in a rigid matrix of styrene-acrylonitrile copolymer, the copolymer being chemically bound to the rubbery phase. The graft ABS type resins are useful as plastic materials in the manufacture of refrigerators, shoe heels, telephones, plastic pipes, machine housing and etc.

Subsequent to the development of the basic ABS resins an improved version was developed wherein the styrene was substituted with alpha-methylstyrene. The replacement results in resins exhibiting higher softening points, higher impact values, far superior aging properties and enormously enhanced resistance when subject to various chemical agents even under stress conditions. The alpha-methylstyrene ABS polymers are further described in U.S. 2,908,661.

One of the major detractions in respect to the alpha-methylstyrene ABS resin as opposed to the styrene ABS resin is that the rate of production of the former is substantially lower, i.e., for a given set of conditions the yield of alpha-methylstyrene ABS resin is significantly lower than for the styrene ABS type resin. This fact in commercial production undesirably requires significantly larger facilities for alpha-methylstyrene resin production for a given volume.

The prior art overcomes these slow rates by conducting polymerization of the polybutadiene, acrylonitrile and alpha-methylstyrene at temperatures above about 80° C. and including styrene as an initiation aid. Although these modifications somewhat alleviate the slow rate of production, the relatively high polymerization temperature of about 80° C. and higher deteriorates the polybutadiene component with a resultant deterioration of the polymer product. Further, the styrene promoter becomes incorporated into the graft polymer and detracts basis the relative extent of its presence from the benefits afforded by the alpha-methylstyrene component.

SUMMARY OF INVENTION

I have discovered, and this constitutes my invention, a method of substantially enhancing the rate of formation of a thermoplastic graft copolymer prepared by copolymerizing a mixture of acrylonitrile and alpha-methylstyrene onto crosslinked polybutadiene or poly(butadiene-methacrylic acid) backbone at temperatures substantially lower than the prior art, and therefore, avoid undesired thermal modification of the backbone. Further, I have discovered a method of producing said graft polymer without resorting to employing less desirable styrene. More specifically I have discovered in the aqueous emulsion polymerization of cross-linked polybutadiene or poly(butadiene-methacrylic acid) copolymer with acrylonitrile and alpha-methylstyrene a satisfactory rate of production can be attained at moderate temperatures of between about 40 and 65° C. in the absence of styrene by employing the polymerization between about 2 and 6 wt. percent of a quarternary ammonium chloride cationic emulsifier having a pH between about 6 and 8 characterized by the formula:

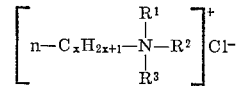

where $x$ is 12, 14, 16 or a mixture of 12, 14 and 16; $R^1$ and $R^2$ are H or $CH_3$ and $R^3$ is H, $CH_3$ or benzyl. This is particularly surprising in that this difference in production rate is not demonstrated in an ABS resin derived from styrene under similar conditions.

Hereinbefore and hereinafter acrylonitrile is designated as A, butadiene as B, methacrylic acid as MAA, styrene as S, and alpha-methylstyrene as MS.

DETAILED DESCRIPTION OF THE INVENTION

Most specifically, the method of the invention comprises a two-stage process comprising polymerizing as a first stage butadiene or a first mixture of butadiene and methacrylic acid at a temperature between about 50 and 65° C. in the presence of cationic emulsifier of a pH between about 6 and 8, polymerization initiator, polymerization modifier, and water to form an aqueous latex of a first crosslinked polymer of polybutadiene or poly(butadiene-methacrylic acid), said first polymer having a gel content between about 60 and 90 wt. percent and an average particle size between about 400 and 1500 A. Then as the second stage of the process copolymerizing an aqueous latex of said first polymer with acrylonitrile and α-methylstyrene in the presence of cationic emulsifier of a pH between about 6 and 8, polymerization initiator and polymerization modifier at a temperature of between about 40 and 65° C. to form a graft copolymer of crosslinked polybutadiene or poly(butadiene-methacrylic acid), acrylonitrile and alpha-methylstyrene, said cationic emulsifier of the formula:

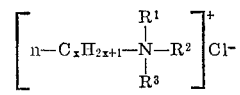

where $x$ is 12, 14, 16 or a mixture thereof, $R^1$ and $R^2$ are hydrogen or methyl and $R^3$ is hydrogen, methyl or benzyl.

The formed synthetic resin product is recovered by standard means such as coagulating the aqueous emulsion at the end of the second stage by the addition of dilute aqueous acid such as aqueous hydrochloric and sulfuric acids or coagulating with salts such as saturated aqueous solutions of alum and calcium chloride in the presence of a polymer stabilizer. The coagulated mixture is filtered and the recovered solids are washed with water and dried. The resultant graft polymer is in condition to be milled and molded for use.

The polymerizations in the first and second steps (stages) are advantageously conducted under conditions of agitation, e.g., stirring or tumbling of the reactor. Further, both polymerizations take place advantageously in the absence of oxygen to prevent undesired consumption of the polymerization initiators. This absence of oxygen can be accomplished by standard means such as conducting the reaction under a blanket of inert gas, e.g., nitrogen and employing distilled, deaerated water.

The pH control in the first and second steps is accomplished by the employment of the defined cationic emulsifier within the desired pH limits. It is to be noted the quaternary ammonium salts contemplated herein are prepared by titration of the corresponding amine with hydrochloric acid. They are actually mixtures of quaternary salt and excess HCl or basic amines when other than of a pH of 7.

In the first step preparation of the crosslinked polybutadiene or poly(butadiene-methacrylic acid) backbone the reaction is normally conducted for a period of between about 7.5 and 15 hours but in any case until the desired average particle size of between about 400 and 1500 A., preferably between about 700 and 900 A., and gel content between about 60 and 90 wt. percent, preferably between about 75 and 85 wt. percent, are obtained. The particle size range of the intermediate polymer backbone product can range from about 200 to 2000 A.

Hereinbefore and hereinafter "gel content" is defined as the toluene insoluble portion of the polymer after heating 1 gram of polymer in 200 ccs. toluene at reflux for 15 hours.

In the first step polymerization the water content generally ranges between about 50 and 80 wt. percent. Further, monomer emulsifier, initiator, modifier and water are heated subsequent to charging to the reactor and due to the volatile nature of some of the components the reaction is conducted under pressure conditions. Still further, in the preparation of the crosslinked poly(butadienemethacrylic acid) backbone the weight ratio of butadiene to methacrylic acid is between about 99:1 and 90:10 and the ratio in the final graft product is substantially the same.

At the end of the first stage reaction the crosslinked rubber product is normally worked-up by adding a chain stopper to the crude latex product as it comes out of the pressure reactor in a heavy cream to whipped cream consistency. The crude product is then advantageously diluted with water to form a latex having a solids content between about 25 and 35 wt. percent. The purpose of this dilution is to promote filtration. In any case, the aqueous emulsion is desirably subjected to reduced pressure or steam blown to remove unreacted butadiene and the residue is then filtered to remove coagulated polymer product.

In the second stage the crosslinked polybutadiene or poly(butadiene-methacrylic acid) aqueous latex filtrate is charged to a reactor followed by the addition of polymerization initiator, polymerization modifier, acrylonitrile, α-methylstyrene and water (if needed). The water content in the initial reaction mixture advantageously ranges between about 60 and 80 wt. percent. The reaction time generally runs 3 to 5 hours. The quantity of polymer reactant, acrylonitrile and α-methylstyrene employed will be in a weight ratio of what ratio is desired in the final product. The weight ratio of reactants and that found in products of A:B:MS and A:B–MAA:MS are normally between about 25:30:45 and 25:15:60.

Example properties of the typical graft polymer product are an Izod impact ft. lb./inch notch (ASTM Test D–256) of about 5 to 10, a heat deflection temperature (ASTM D–648 Mod.) of about 95 to 105° C. and a tensile strength (ASTM D–648 Mod.) of 5000 to 8000 p.s.i. The Izod values herein are based on compression molded samples and the heat deflection test is based on a .02" rather than a .01" deflection.

The cationic emulsifier in the first and second stage polymerizations is normally employed in an amount ranging from about 2 to 6 wt. percent of the reaction mixture and usually as 3 to 5 wt. percent aqueous solutions where soluble. Specific examples of the cationic emulsifier contemplated herein are n-dodecylammonium chloride, n-tetradecyltrimethylammonium chloride, n-hexadecyldimethylammonium chloride, n-dodecylmethylammonium chloride and a mixture of $C_{12}$-, $C_{14}$-, and $C_{16}$- n-alkyldimethylbenzylammonium chlorides all adjusted to have a pH between about 6 and 8. It is to be noted the last mentioned emulsifier is relatively water insoluble and is normally dissolved in ethanol before use. Since ethanol tends to coagulate the polymer in the first step polymerization, its use is limited to the second step graft polymer formation.

Examples of the polymerization initiators contemplated herein are the water soluble initiators such as hydrogen peroxide, sodium peroxide, sodium perborate, sodium percarbonate, sodium persulfate and the potassium and ammonium salts of the foregoing and other peroxy acids and water soluble compounds containing the peroxy radical —O—O—. Other suitable polymerization initiators are the dihydrocarbyl peroxides, e.g., dibenzyl peroxide, di-t-butylperoxide, dilaurylperoxide, diacetyl peroxide, and dicapryl peroxide. In addition to the foregoing, hydroperoxides may be employed as initiators such as cumene hydroperoxide in combination with sodium pyrophosphate, dextrose and ferrous sulfate. This latter type initiator functions on the basis of a redox system. The polymerization initiators are normally present in the first and second stage reaction mixtures in amounts between about 0.25 and 1 wt. percent.

Any of the standard polymerization modifiers for the control of the degree of polymerization may be employed such as the alkyl mercaptans of from 8 to 16 carbons, particularly the tertiary alkyl mercaptans. Specific examples of the mercaptans contemplated are t-hexadecyl mercaptan, mixed t-$C_{12}$–$C_{16}$ alkyl mercaptan, and n-dodecyl mercaptan. Additional modifiers are dihydrocarbyl disulfides of from 1 to 16 carbons wherein the hydrocarbyl group is alkyl, aryl, alkaryl and aralkyl such as dibutyl disulfide, dibenzyl disulfide, diphenyl disulfide and ditolyl disulfide. The modifiers are employed in an amount of between about 0.15 and 0.8 wt. percent based on the reaction mixture.

The chain stoppers employed function to terminate polymerization by eliminating the free radicals present and are desirably incorporated in the final mixture generally in amounts of the order of a 0.1 wt. percent. Examples of chain stoppers contemplated herein are sodium dimethyl dithiocarbamate, sodium diethyl dithiocarbamates, sodium dithionite, hydroquinone,, phenyl hydrazine and sodium sulfide.

To the final graft copolymer resin product of the invention there may be added the standard additives such as antioxidants and stabilizers, e.g., di-t-butyl-p-cresol and phenyl β-naphthylamine, and tris nonylphenyl phosphite. These stabilizers are normally incorporated in the final resin in amounts of between about 0.4 and 1.0 wt. percent, preferably before recovery of the resin from the final emulsion.

A critical aspect of the method of the invention is the employment of the defined cationic emulsifier. If anionic emulsifiers such as the well known fatty acid soaps, e.g., the potassium and sodium soaps of lauric, myristic, palmitic and oleic acid, the alkali metal salts of lauryl sulfate are employed irrespective of pH, the reaction rate is substantially decreased. Further, if the defined cationic emulsifiers are outside the pH range as defined in the second stage, the yield of graft polymer product will be also substantially reduced. Surprisingly, when styrene is substituted for alpha-methylstyrene in the method of the invention there is no evidence of this criticality.

In the first stage of the method, i.e., in the preparation of the crosslinked polybutadiene or poly(butadiene-methacrylic acid) backbone, it is important to employ the type of cationic emulsifier as defined since the use of an anionic emulsifier in the first stage will cause undesirable coagulation in the initial phases of the graft polymer formation second stage.

The following examples further illustrate the method of the invention but are not to be construed as a limitation thereof.

EXAMPLE I

The general procedure employed was as follows:

In background, polymerization was effected in all cases in a 30 ounce "pop" bottle capped with crown closures in which the cork had been replaced by a rubber gasket. In respect to Step I to a "pop" bottle there was charged n-dodecylammonium chloride (emulsifier) followed by the addition of the n-dodecyl mercaptan (modifier) and potassium persulfate (initiator). The remaining water which makes up the difference between the emulsifier solution and the total amount of water required was then added. It is to be noted that water employed in the procedure was boiled demineralized water, cooled and stored under a blanket of nitrogen to remove dissolved oxygen. The bottle was then blanketed with nitrogen and stoppered and chilled in an ice-hydrochloric acid bath at −5° C. for approximately ½ hour. The bottle was tared and 1,3-butadiene or a mixture of 1,3-butadiene and methacrylic acid was added in an amount in excess of that required and the bottle capped when the correct amount of butadiene had distilled. The chilled (about 0° C.) bottle was shaken to emulsify the monomer(s) before being placed in the polymerization bath. The bottle was then rotated at a speed of 20 r.p.m. beneath the surface of the bath water thermostated at 65±1° C. After the desired time had elapsed the bottle was removed from the bath and allowed to cool at room temperature. The bottle containing the resultant cross-linked polybutadiene or poly(butadiene-methacrylic acid) product and residual unreacted butadiene was cooled to ice bath temperatures before opening. The bottle was tared and opened allowing excess butadiene to escape. A quantity of 15–75 mls. (in order to give 25–35% polymer content) of water was added along with two drops of a saturated chain stopping solution of sodium diethyl dithiocarbamate to destroy any free radicals still present. The bottle was then capped and shaken to make the latex homogeneous. The bottle was opened and placed under vacuum for about 15 minutes to remove unreacted butadiene trapped in the polymer. The latex was reweighed to determine a conversion factor and filtered using a coarse screen of 100 mesh (U.S. Standard). The polymer content of latex was determined gravimetrically. The latex particle size was determined by electron microscopy.

To a pint bottle there was charged a solution emulsifier subsequently followed by the addition of acrylonitrile and alpha-methylstyrene and mercaptan. The pint bottle was capped and shaken vigorously to emulsify the monomers. The emulsified monomers along with the polymerization initiator were charged to a 30 oz. "pop" bottle containing a weighed amount of an aqueous latex polybutadiene or poly(butadiene-methacrylic acid) polymer. The adjusted amount of water to reach the desired final dilution was added to rinse in the emulsified monomers and polymerization catalyst. The water employed in the latex as well as the adjusted amount of addition was distilled oxygen free water which had been stored under a blanket of nitrogen. The "pop" bottle was then blanketed with nitrogen and capped. The bottle was placed in a bath maintained at 65° C. and was rotated in said bath end over end at 20 r.p.m. beneath the surface of the water. At the end of the reaction time the bottle was removed from the bath, and cooled before being opened. The bottle was opened and the contents poured into a beaker containing 1.5 liter of methanol and a gram of phenyl β-naphthylamine. Two drops of 36 wt. percent hydrochloric acid were added to aid in precipitation of the resin. The resultant resin was filtered, dried in a forced air oven and identified as the graft copolymer of crosslinked polybutadiene-acrylonitrile-methylstyrene or crosslinked poly(butadiene-methacrylic acid)-acrylonitrile-alpha-methylstyrene depending on the ingredients.

The specific test data and results are reported below:

Step I polymerization recipe for poly(B–MAA) manufacturing [1]

| Ingredients: | Wt. grams |
|---|---|
| Butadiene | 100 |
| Methacrylic acid | 6 |
| n-Dodecylammonium chloride (pH 5.6) | 3.0 |
| Potassium persulfate | 0.25 |
| Water (total) | 125 |
| n-Dodecyl mercaptan | 0.4 |

[1] Reaction time 15.25 hours at 65° C. to give 88 wt. percent yield of poly(butadiene-methacrylic acid) or an average particle size of 800 A. and a gel content of 80 wt. percent.

Step I polymerization recipe for polybutadiene manufacturing [2]

| Ingredients: | Wt. grams |
|---|---|
| Butadiene | 100 |
| n-Dodecylmercaptan | 0.15 |
| n-Dodecylammonium chloride (pH 5.6) | 3.0 |
| Potassium persulfate | 0.25 |
| Water (total) | 125 |

[2] Reaction time 20 hours at 65° C. to give an 85 wt. percent yield of polybutadiene having a gel content of 80 wt. percent and an average particle size of 800 A.

Step II graft polymer manufacturing

| Run | 1 | 2 | 3 |
|---|---|---|---|
| Ingredients, g.: | | | |
| Poly(butadiene-MAA) latex [a] | 80 | | 64 |
| Polybutadiene latex [b] | | 72 | |
| Acrylonitrile | 40 | 40 | 25 |
| α-Methylstyrene | 80 | 80 | |
| Styrene | 0 | 0 | 55 |
| Benzoyl peroxide | 0.25 | | 1 |
| Cumene hydroperoxide | | 1 | |
| Water (total) | 150 | 180 | 185 |
| C₁₂-, C₁₄-, C₁₆-n-alkyldimethylbenzylammonium chloride (pH 6.5) | 4 | 4.0 | |
| n-Dodecylammonium chloride (pH 5.6) | | | 3.0 |
| Reaction conditions: | | | |
| Time, hrs | 3 | 3 | 28 |
| Temp., ° C | 65 | 65 | 40 |
| Graft polymer product: | | | |
| Yield, wt. percent | 90 | 92 | 95 |
| Izod impact, ft.lb./inch notch | 7.1 | 2.7 | 8.2 |
| Heat deflection, ° C | 105 | 97.5 | 91.0 |
| E. modulus×10⁻³, p.s.i | 295 | 322 | 257 |
| Tensile strength, p.s.i | 6,800 | 7,200 | 5,500 |

[a] 32 wt. percent poly(B–MAA) in aqueous latex.
[b] 28 wt. percent poly B in aqueous latex.

EXAMPLE II

This example illustrates the unexpected materiality of the particular combination of ingredients and pH of the invention as specifically demonstrated by Example I.

The overall reaction procedure was that as described in Example I. Run 4 represents the method of the invention and Runs 5, 6, 7, 8 and 9 are comparative.

Step I polymerization recipe

| Run | 4 | 5 | 6 | 7 | 8 | 9 |
|---|---|---|---|---|---|---|
| Ingredients, g.: | | | | | | |
| 1,3-butadiene | 100 | 100 | 100 | 100 | 100 | 100 |
| Water | 80 | 80 | 80 | 80 | 80 | 80 |
| K persulfate | 0.25 | 0.25 | 0.25 | 0.25 | 0.25 | 0.25 |
| n-Dodecylammonium chloride | [a] 4 | | | [b] 4 | [c] 4 | |
| Sodium lauryl sulfate (pH 8) | | 1.5 | 1.5 | | | 1.5 |
| n-Dodecylmercaptan | 0.15 | 0.15 | 0.15 | 0.15 | 0.15 | 0.15 |

[a] pH 6.8. [b] pH 4.5. [c] pH 9.

Step II polymerization recipe

| Run | 4 | 5 | 6 | 7 | 8 | 9 |
|---|---|---|---|---|---|---|
| Ingredients, g.: | | | | | | |
| Polybutadiene latex * | 80 | 80 | 80 | 80 | 80 | 80 |
| Acrylonitrile | 40 | 40 | 40 | 40 | 40 | 25 |
| α-Methylstyrene | 80 | 80 | 80 | 80 | 80 | |
| Styrene | | | | | | 50 |
| Benzoyl peroxide | 0.25 | 0.25 | 0.25 | 0.25 | 0.25 | 0.25 |
| Water, total | 150 | 150 | 150 | 150 | 150 | 150 |
| Sodium lauryl sulfate (pH 8) | | 4 | | | | 4 |
| n-Dodecylammonium chloride | a 4 | | b 4 | c 4 | d 4 | |
| Time, hrs | 3 | 3 | 3 | 3 | 3 | 3 |
| Temp., °C | 65 | 65 | 65 | 65 | 65 | 65 |
| Graft terpolymer product: Yield, wt. percent | 94 | 30 | Coag. | 28 | 37 | 95 | a pH 6.8.   b pH 6.8.   c pH 4.5.   d pH 9.
* Polymer content=33 wt. percent.

EXAMPLE III

This example further illustrates the criticality of a pH range for emulsifier as defined.

The overall procedure for the second stage graft polymerization step of Example I was employed, however, the polymerization was limited to an alpha-methylstyrene-acrylonitrile polymerization which is essentially the main reaction taking place in the second stage of the method of the invention. The test data and results are reported below:

POLYMERIZATION DATA

Ingredients:

| | |
|---|---|
| α-Methylstyrene | wt. grams__ 80 |
| Acrylonitrile | do____ 36 |
| $C_{12}$-, $C_{14}$-, $C_{16}$ n-alkyldimethylbenzylammonium chloride | do____ 4.0 |
| t-Hexadecylmercaptan | do____ 0.6 |
| Cumene hydroperoxide | ml__ 1.0 |
| Water, total | 180 |

Polymerization time, temp., 3 hrs. at 65° C.

pH emulsifier vs. polymer yield

| pH ADBA [1]: | Wt. percent copolymer yield |
|---|---|
| 4.0 | [2] 16.2 |
| 5.0 | 26.6 |
| 6.0 | 60.4 |
| 7.0 | 83.0 |
| 8.0 | 58.8 |
| 9.0 | 28.0 |

[1] ADBA is a mixture of $C_{12}$-, $C_{14}$-, $C_{16}$-n-alkyl dimethylbenzylammonium chlorides.
[2] Average of 4 runs.

I claim:

1. A method of preparing a synthetic resin of crosslinked polybutadiene- or crosslinked poly(butadiene-methacrylic acid)-acrylonitrile-α-methylstyrene graft polymer consisting essentially of first polymerizing under aqueous emulsion polymerization conditions at a first temperature between about 50 and 65° C., a first member selected from the group consisting of butadiene and a first mixture of butadiene and methacrylic acid in the presence of water, polymerization initiator, polymerization modifier, and a first polymerization cationic emulsifier to form an aqueous latex containing a first polymer selected from the group consisting of polybutadiene and poly(butadiene-methacrylic acid), second polymerizing under aqueous emulsion polymerization conditions at a second temperature between about 40 and 65° C. an aqueous latex of said first polymer with a mixture of acrylonitrile and alpha-methylstyrene under aqueous emulsion polymerization conditions in the presence of water, polymerization initiator, polymerization modifier, and a second polymerization cationic emulsifier, to form said graft polymer, said emulsifier having a pH of between about 6 and 8 characterized by the general formula:

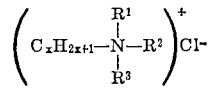

where $x$ is 12, 14, 16, or mixtures thereof, $R^1$ and $R^2$ are hydrogen or methyl and $R^3$ is hydrogen, methyl or benzyl and being present in an amount between about 2 and 6 wt. percent, said first mixture having a weight ratio of butadiene to methacrylic acid of between about 99:1 and 90:10, said first polymer having a gel content between about 60 and 90 wt. percent and an average particle size between about 400 and 1500 A., said acrylonitrile (A) butadiene (B) and alpha-methylstyrene (MS) being introduced in said method in a weight ratio of between about 25:30:45 and 25:15:60 of A:B:MS.

2. A method in accordance with claim 1 wherein said first member is butadiene, said first polymer is a polybutadiene, and said first and second cationic emulsifier is n-dodecylammonium chloride.

3. A method in accordance with claim 1 wherein said first member is said first mixture, said first polymer is a poly(butadiene-methacrylic acid), and said first and second cationic emulsifier is n-dodecylammonium chloride.

4. A method in accordance with claim 1 wherein said first member is butadiene, said first polymer is polybutadiene, said first cationic emulsifier is n-dodecylammonium chloride, said second cationic emulsifier is a mixture of $C_{12}$-, $C_{14}$-, and $C_{16}$ n-alkyldimethylbenzylammonium chlorides.

5. A method in accordance with claim 1 wherein said first member is said first mixture, said first polymer is poly(butadiene-methacrylic acid), said first cationic emulsifier is n-dodecylammonium chloride and said second cationic emulsifier is a mixture of $C_{12}$-, $C_{14}$-, $C_{16}$ n-alkyldimethylbenzylammonium chloride.

References Cited

UNITED STATES PATENTS

| | | | |
|---|---|---|---|
| 2,802,808 | 8/1957 | Hayes | 260—880 |
| 2,859,201 | 11/1958 | Uraneck et al. | 260—880 |
| 2,908,661 | 10/1959 | Calvert | 260—880 |
| 3,170,964 | 2/1965 | Grabowski | 260—880 |
| 3,442,979 | 5/1969 | Ott et al. | 260—880 |

JAMES A. SEIDLECK, Primary Examiner

U.S. Cl. X.R.

260—29.7, 82.1